United States Patent
Erickson

(10) Patent No.: US 9,673,887 B1
(45) Date of Patent: Jun. 6, 2017

(54) SELF-CALIBRATION OF A COMMUNICATIONS DEVICE FOR TRANSMIT POWER LEVEL CONTROL

(71) Applicant: Rockwell Collins, Inc., Cedar Rapids, IA (US)

(72) Inventor: Alan R. Erickson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 137 days.

(21) Appl. No.: 14/222,294

(22) Filed: Mar. 21, 2014

(51) Int. Cl.
H04B 7/185 (2006.01)

(52) U.S. Cl.
CPC .............................. *H04B 7/18513* (2013.01)

(58) Field of Classification Search
CPC combination set(s) only.
See application file for complete search history.

(56) References Cited

U.S. PATENT DOCUMENTS

| | | | |
|---|---|---|---|
| 6,188,678 B1* | 2/2001 | Prescott | H04W 52/24 370/318 |
| 6,829,226 B1* | 12/2004 | Apostolides | H04B 7/18543 370/318 |
| 8,195,105 B1* | 6/2012 | Erickson | H03F 1/3247 455/115.1 |
| 2006/0152285 A1* | 7/2006 | Gustavsson | H04W 52/08 330/278 |
| 2008/0225168 A1* | 9/2008 | Ouslis | H04N 5/4401 348/554 |

OTHER PUBLICATIONS

Oetting, John D., and Tao Jen. "The mobile user objective system." Johns Hopkins Apl Technical Digest 30.2 (2011): 103-112.*
Chase, Kenneth W. "Tolerance allocation methods for designers." ADCATS Report 99.6 (1999): 1-28.*

* cited by examiner

*Primary Examiner* — Yuwen Pan
*Assistant Examiner* — Zhitong Chen
(74) *Attorney, Agent, or Firm* — Angel N. Gerdzhikov; Donna P. Suchy; Daniel M. Barbieri

(57) ABSTRACT

The present disclosure is directed to a method for calibrating a communications device. The method may include the step of determining a first coefficient based on correction data obtained by the transition from an initial open loop power operation to a power level of a closed loop operation. The method may also include the step of determining a second coefficient of transmitter gain based on the power of one or more transmissions by the communications device. A further step of the method may include determining a strength of a downlink signal received by the communications device from a satellite computed from knowledge of a receiver gain represented by the first coefficient. The method may also include the step of determining a transmit power level for the communications device based on the strength of the downlink signal, the first coefficient, and the second coefficient of transmitter gain.

20 Claims, 4 Drawing Sheets

US 9,673,887 B1

SELF-CALIBRATION OF A COMMUNICATIONS DEVICE FOR TRANSMIT POWER LEVEL CONTROL

TECHNICAL FIELD

The present disclosure relates generally to feedback circuits, and more particularly to initial transmit power level determination for a communications device in communication with a satellite.

BACKGROUND

A communications satellite is an artificial satellite sent to space for the purpose of telecommunications. A communications system utilizing one or more communications satellites may be referred to as a satellite communications system. Satellite communications systems may include long signal delays because of the large distances involved and include tight tolerances on signal parameters.

SUMMARY

The present disclosure is directed to a method of determining an acceptable initial transmit power level to a satellite from a communications device which may have loose tolerances of transmitter gain and receiver gain. The method may include the step of receiving a downlink signal from the satellite via the communications device. The method may also include the step of determining a strength of the downlink signal computed from knowledge of a receiver gain represented by a first coefficient. The first coefficient is based on historical data, including correction data obtained by the transition from a power level of an initial open loop transmit power control operation to a power level of a closed loop transmit power control operation. The method may also include the step of determining the initial transmit power level for the communications device based on the strength of the downlink signal, the first coefficient, and a transmitter gain represented by a second coefficient.

The present disclosure is further directed to a communications device configured for communication with a satellite. The communications device may include a receiver configured for receiving one or more signals from the satellite, including a downlink signal. The communications device may also include a transmitter configured for transmitting one or more signals to the satellite. The communications device also includes a processor in communication with the receiver and the transmitter. The processor is further configured to determine a strength of the downlink signal computed from knowledge of receiver gain represented by a first coefficient. The processor further configured to determine an initial transmit power level for the communications device based on the strength of the downlink signal, the first coefficient, and a second coefficient representing transmitter gain.

The present disclosure is also directed to a method for calibrating a communications device. The method may include the step of determining a first coefficient based on correction data obtained by the transition from an initial open loop power operation to a power level of a closed loop operation. The method may also include the step of determining a second coefficient of transmitter gain based on the power of one or more transmissions by the communications device. A further step of the method may include determining a strength of a downlink signal received by the communications device from a satellite computed from knowledge of a receiver gain represented by the first coefficient. The method may also include the step of determining a transmit power level for the communications device based on the strength of the downlink signal, the first coefficient, and the second coefficient of transmitter gain.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Satellite communications that adhere to particular standards may create unique calibration challenges, particularly depending on the communication system seeking to communicate with the satellite. Some communication systems may include modular components and platform cables having varying amounts of signal loss. Each modular component may have performance variations constrained by system tolerances. Communications systems which include multiple modular components having different system performance and variable cable lengths may need to rely on field calibration as well as coordination and management of system tolerances among the various modular components. The resulting module allowances of the system tolerances may be unacceptably tight for each modular component, and in some cases even beyond acceptable margins. The tight allowances may require lengthy factory testing for the modular components and field calibration due to the variable cable lengths.

In addition, some satellite systems include closed loop power control functionality that requires power control in very small precise steps requiring excellent gain linearity. Although the satellite systems may include programs that use software linearization to compensate for gain linearity, these programs may not be suitable when the communications system includes multiple modular components.

Figure 1:
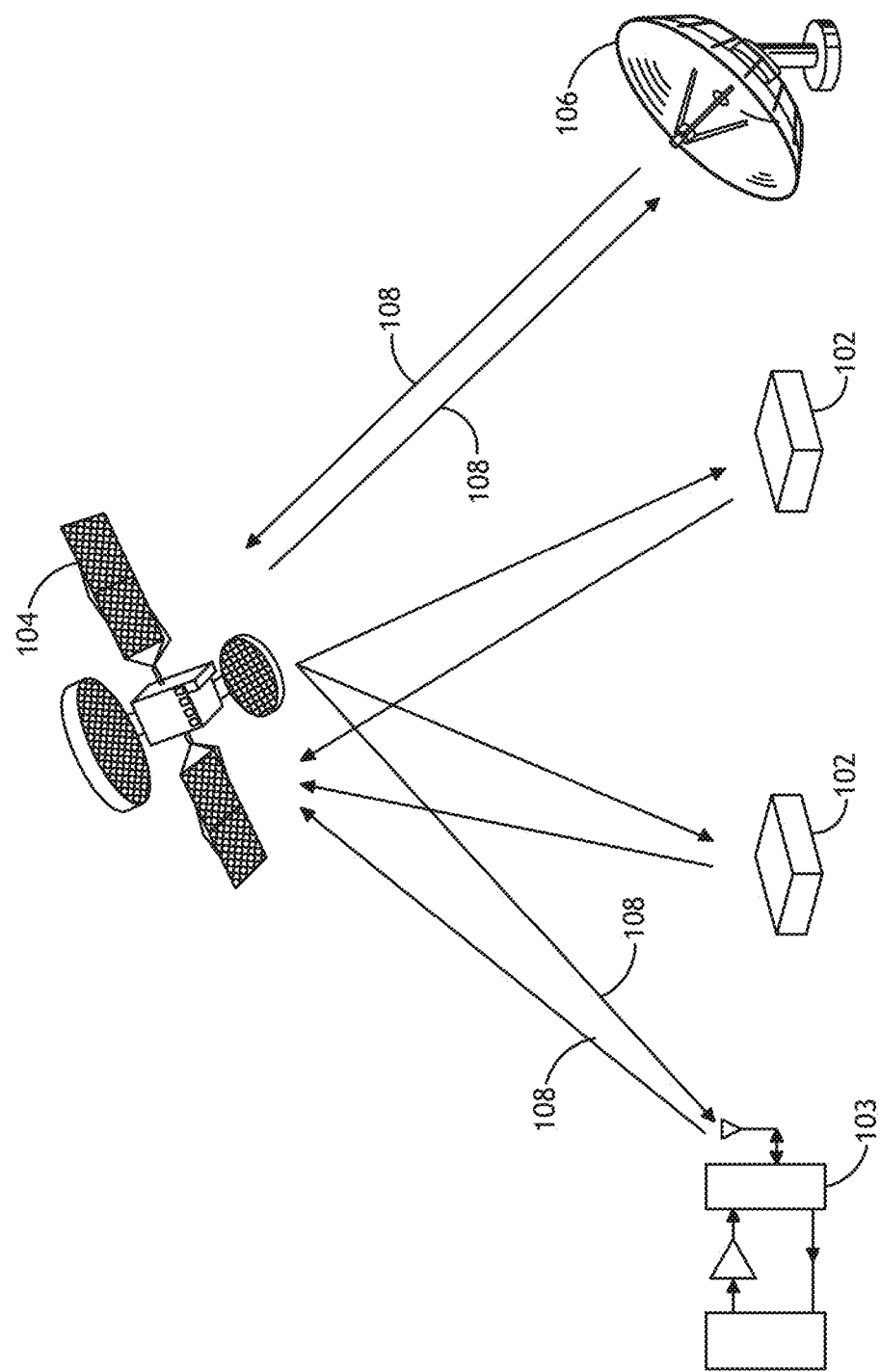
FIG. 1 is an illustration of a satellite communications system with a long signal delay, including several communications devices communicating via a satellite to a base station.

Satellite communications systems may involve multiple communications devices (multiple users), each sharing the same frequency and time and separated only by each communications device using a different spreading code. One such method of separating user signals is known as Wideband Code Domain Multiple Access (WCDMA), and an example configuration is provided in FIG. 1. In FIG. 1, several communications devices 102 and a communications device 103 including multiple modular components are in communication with a satellite 104, and the satellite 104 is in communication with a ground station 106.

When each communications device 102 or the multiple modular component communications device 103 are sharing the same frequency and time, the signal power from each communications device 102 (or multiple modular component communications device 103) from the perspective of the satellite 104 must be similar in order to avoid signal degradation. For example, if the signal power of one communications device 102 is significantly higher than the other communications devices 102, the signals of the lower power communications device 102 may be degraded. If the power of any communications device 102 is significantly lower than other communications devices 102 from the perspective of the satellite 104, the lower power signal may be lost. In order to regulate user power levels, the satellite 104 may control the power received at the common point via a return signal path. In the example shown in FIG. 1, the system controller is the ground station 106 which evaluates the signal of each communications device 102 at the satellite 104. The multiple modular component communications device 103 is used interchangeably with the communications device 102 in the forgoing description, and it will be understood that the communications device 102 may include a single component communications device 102 or a multiple modular component communications device 103 in this disclosure.

Existing systems where WCDMA may be used include systems incorporating the terrestrial Third Generation Partnership Program (3GPP). For terrestrial users, the power control issue is commonly referred to as the "near-far problem." The "near-far" problem refers to the circumstance where communications devices of users located closer to a common point (such as a cell tower, for example) have a greater signal strength from the perspective of the common point compared to "far" communications devices of users which are located farther away from the common point and therefore weaker and potentially overpowered. In WCDMA, all communications devices are controlled to equalize the power received at the satellite of all communications devices at all times. In 3GPP, the user's transmit power is managed by fast control loops. For fast initial access without disturbing ongoing connections, a procedure is done whereby communications devices "ramp up" in an open loop manner until the common point (the cell tower in this example) acknowledges the user. This ramping is very fast because the signal paths are generally short, and the time spent ramping does not degrade initial call set up time. Ramping is a method of transmitting the first request for service at a low power, low enough so that the signal received at the cell tower is below the signal of other users as received at the tower accounting for coarse tolerances, then upon not hearing an acknowledgement, increasing power and again waiting for acknowledgement. Ramping is done each time a new call is made. Because ramping can tolerate large tolerances, the calibration accuracy of such communications devices does not need to be very high. After acknowledgement, the cell tower begins to send commands to the communications device to control its transmitter power. This transitions the system from open loop to closed loop control. During closed loop control, the user's communications device transmit power is commanded up or down in very small increments via a fast control loop based on received signal strength at the cell tower.

Where the signal path is very far, such as in the example shown in FIG. 1, the signal delay is very long, and determining the initial power accurately without interference to other communications devices 102 may take an intolerably long set up time. For example, satellite systems, such as the Mobile User Objective System (MUOS), may use geosynchronous satellites and have very long signal propagation times. The example shown in FIG. 1 demonstrates the length of the signal path 108. First, the signal travels from the communications device 102 to the satellite 104, and then the signal travels from the satellite 104 to the ground station 106. Likewise, the ground station 106 must communicate via the satellite 104 in order for the signal to reach the communications device 102. In some cases, the signal path 108 may be even longer when the ground station 106 communicates to a central switching center. This long signal path 108 makes existing transmit power level determination methods such as ramping impractical within acceptable set up times.

Figure 3:
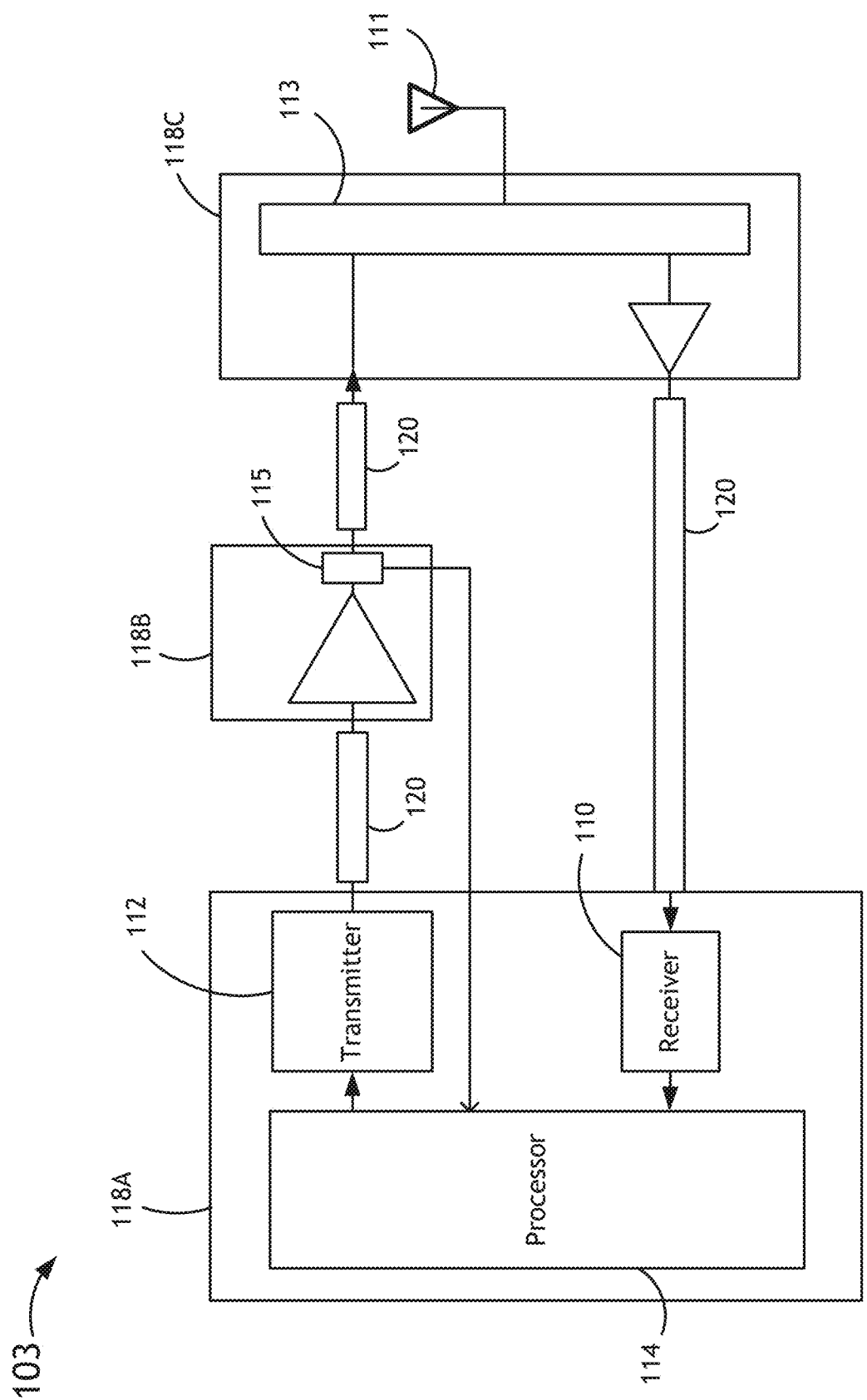
FIG. 3 is an illustration of a communications device including a plurality of modular components.

In one approach of setting initial open loop power in a system with very long signal paths such as in FIG. 1, the receive signal strength of the satellite 104 is accurately measured in the communications device 102, and the result is used to compute the needed transmitter power for the communications device 102. Fast loop response as used by 3GPP is replaced with accuracy to avoid intolerably long call set up time. MUOS initial call set up is done at a power level computed to ensure a high percentage of first-time success without overpowering signals from other communications devices 102 at the satellite 104. In MUOS, standards allocate strict tolerances to the communications device 102 for measuring received signal strength from the satellite 104. In addition, MUOS also allocates tight tolerances to the transmitter gain so that amplified low level transmit signals will result in accurate power output at the communications device 102 antenna 111. Accurate transmit power is important to avoid interference with other user's signals, yet be heard in the presence of other user's signals at the satellite.

Where the communications device 103 consists of multiple modular components, dividing the overall tolerances among the modular components results in very tight allocations for each modular component. An example of a multiple modular component communications device 103 is shown in FIG. 3. When using multiple modular components 118, the losses of interconnecting cables varies 120 depending on the platform the modular components 118 are installed in. These variable cable lengths 120 may require the system to be field calibrated. The combination of variable cable lengths and tight tolerances distributed over the modular components 118 may require lengthy factory calibration and increased costs in order to achieve compliance with MUOS standards, or the tolerance may be unachievable in some cases.

Figure 2:
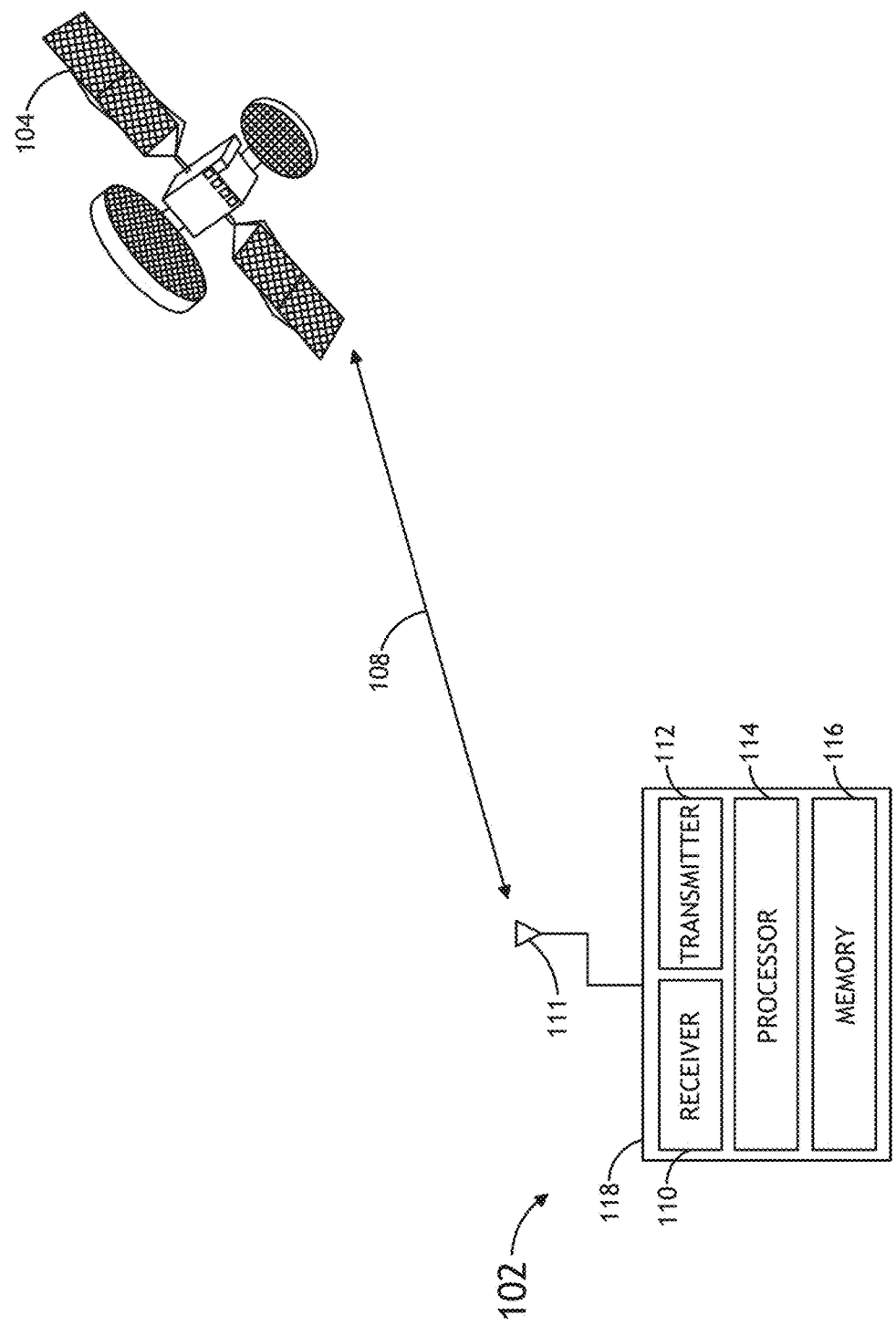
FIG. 2 is a block diagram of a communications device.

Thus, there exists a need for improved systems and methods for determining an initial transmit power from a communications device 102 to a satellite 104 that are suitable for use in communications devices that may include a single or multiple modular components. Referring generally to FIG. 2, a communications device 102 configured for communication with a satellite 104 is provided. The communications device 102 may include a receiver 110 configured for receiving one or more signals from the satellite 104. The signals received from the satellite 104 may include a downlink signal. The communications device 102 may also include a transmitter 112 configured for transmitting one or more signals to the satellite 104. The receiver 110 and transmitter 112 may also have an antenna 111 for receiving and transmitting the signals with the satellite 104. The communications device 102 may also include a processor 114 in communication with the receiver 110 and the transmitter 112. The communications device 102 may also include a memory 116 in communication with the processor. The memory 116 may be a separate element in one embodiment, or included with the processor 114 in another embodiment.

The processor 114 of the communications device 102 shown in FIG. 2 may be configured to determine the strength of the downlink signal. The downlink signal may be computed from knowledge of receiver gain represented by a first coefficient. The processor 114 may be further configured to determine an initial transmit power level for the communications device 102 based on the strength of the downlink signal, the first coefficient, and a second coefficient representing transmitter gain.

The first coefficient may represent receiver gain and may be based on historical data. If no historical data is available (such as during initialization, for example), the first coefficient may be determined via an initialization procedure. For example, to initially determine the first coefficient when historical data is not yet available, the communications device 102 may make one or more transmissions to the satellite 104. If the transmission is not received by the satellite 104 (as indicated in the downlink from the satellite 104), the power level is increased incrementally until the satellite 104 responds. When the satellite 104 responds, it will begin sending power control commands back to the communications device 102. Then the first coefficient may be derived. The coefficient may be derived from the value of transmitter power that resulted in operation with the satellite 104. Alternately, the first coefficient may be based on a comparison of the initial computed open loop power (from inaccurate receive calibration) with the power level as commanded from the satellite 104 when the closed loop operation reaches equilibrium. After the initialization procedure, the calibration values are stored as the first coefficient. In subsequent transmissions, the communications device 102 may not need to complete the full initialization procedure in order to calculate receiver gain, but rather may rely upon the first coefficient to represent the receiver gain. In addition, the first coefficient may be updated during normal operation of the communications device 102.

The second coefficient used by the processor 114 to represent the transmitter gain may also be based on historical data. For example, the second coefficient may be based on one or more transmissions made by the communications device 102 to the satellite 104. For example, the second coefficient may be determined during transmissions and measuring the output power of the transmitter. In one embodiment, the power measurements may be taken by a power measurement device 115 at the output of the transmitter 112.

The first coefficient representing receiver gain, second coefficient representing transmitter gain, and downlink signal strength may be used to by the processor 114 to determine an initial transmit power level for the communications device 102. The initial transmit power level may be in accordance with a specific satellite communications standard. More specifically, the communications device 102 may be configured to communicate with the satellite 104 utilizing a specific satellite communication standard through an appropriate antenna 111 for the specific communication spectrum. For example, if the satellite 104 is one of the Mobile User Objective System (MUOS) satellites, the antenna utilized should be appropriate for the Ultra High Frequency (UHF) communication spectrum or within any other appropriate communications spectrum for MUOS communications. It is noted that MUOS is referenced in the present disclosure as an exemplary satellite communications system. It is contemplated that the communications device 102 and related methods described herein may be configured to be compatible with various other types of satellite communications systems, and within alternate ranges of the communications spectrum, without departing from the spirit and scope of the present disclosure.

The transmitter 112 of the communications device 102 may include any suitable transmitter 112 capable of transmitting radio frequency signals to the satellite 104. The transmitter 112 may include an antenna 111. The receiver 110 of the communications device 102 may include any suitable receiver 110 capable of receiving radio frequency signals from the satellite 104. The receiver 110 may also include an antenna 111. Similarly, the transmitter 112 and receiver 110 may embody a single element, such as a transceiver, or may be separate elements. In addition, the transmitter 112 and the receiver 110 may have separate antennas, or use a single antenna for both elements. In the example shown in FIG. 2, the transmitter 112 and the receiver 110 are provided in a single element and use a single antenna 111. In the example shown in FIG. 3, the antenna 111 may be coupled to a diplexer 113 that is configured to enable the transmitter 112 and receiver 110 to use a single antenna 111.

The processor 114 may include any suitable computer processor and low power signal processing elements. The satellite 104 may include a geosynchronous satellite. In one embodiment, the satellite 104 includes a MUOS satellite 104. The communications device 102 may further include a memory 116 configured for storing historical data and transmission data related to the first coefficient and second coefficient.

The communications device 102 may be comprised of a single modular component 118 or two or more modular components 118. An example communications device 103 including two or more modular components 118 is shown in FIG. 3. In the example shown in FIG. 3, a first modular component 118A, second modular component 118B, and third modular component 118C are included in the communications device 103. The first modular component 118A, second modular component 118B, and third modular component 118C are connected by cables 120. The cables 120 may have varying lengths and therefore various losses, as shown in the example in FIG. 3. Each modular component 118A-C has a specific tolerance. The sum of the tolerances for each modular component plus the sum of all cable loss variations is equal to a total tolerance for the communications device 103.

The communications device 103 shown in FIG. 3 may be configured to communicate with the satellite 104 according to the MUOS standard. When the communications device 103 includes multiple modular components 118A-C as shown in FIG. 3, dividing the overall tolerances among the modular components 118 results in very tight allocations for each modular component 118. In addition, when using multiple modular components 118, the losses of interconnecting cables 120 may also contribute to overall losses for the communications device 103. Typically, this would require field calibration, such as the installer entering cable length information. The cable 120 losses may be accounted for at the system level by the closed loop corrections used in determining the first coefficient. The transmit path may also be separately calibrated because receiver gain values may have additional applications, and removing the transmit variation may improve the first coefficient accuracy.

The first coefficient and second coefficient may be revised and updated over time by executing the initialization procedure and re-setting the first coefficient value. The components of the communications device 102 may degrade due to system changes, environmental changes, system failures, replacement of modular components 118, or aging effects. The processor 114 may be configured to account for modular component 118 aging effects and other changes to continue to provide highly accurate open loop performance. In one embodiment, the value of the first coefficient and/or second coefficient may be updated from time to time. In another embodiment, the first coefficient and second coefficient may be updated at a specified interval or in response to a particular event, such as a failure, error, or replacement of one or more of the modular components 118 of the communications device 102.

As the first coefficient corresponds to receiver gain and the second coefficient corresponds to transmitter gain, the value of the first coefficient and second coefficient may change according to different power levels as gain may vary depending on power level. The value of the first coefficient and the second coefficient may be determined for different power levels and compiled into an array or table. An array of first coefficient values and second coefficient values at different power levels may be useful for linearization. For example, if the downlink signal strength is known and a transmit power level for the communications device is desired, then an appropriate value for the first coefficient or the second coefficient may be selected from the array.

The term "modular component" 118 in this disclosure may refer to a modular component 118 of any manufactured device that is designed to be replaced quickly at an operating location. Examples of modular components may include (but are not limited to) receivers, transmitters, transceivers, amplifiers, filters, interconnecting cables.

Figure 4:
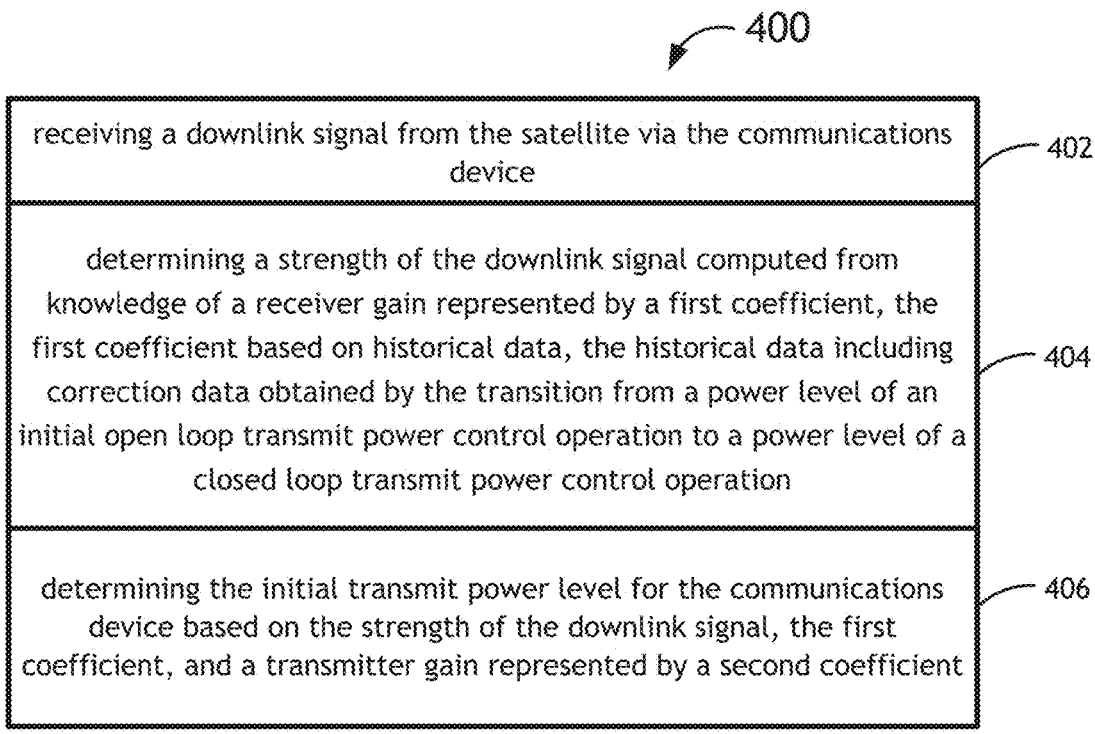
FIG. 4 is a flow diagram depicting a method for determining an acceptable initial transmit power level from a communications device to a satellite.

The present disclosure is further directed to a method 400 for determining an initial transmit power level from a communications device to a satellite, as shown in FIG. 4. The method 400 may be used by the communications device 102 shown in FIGS. 1-3. The method 400 may include the step of receiving a downlink signal from the satellite via the communications device 402. The method 400 may further include the step of determining the strength of the downlink signal computed from knowledge of a receiver gain represented by a first coefficient based on historical data 404. The historical data may include correction data obtained by the transition from a power level of an initial open loop transmit power control operation to a power level of a closed loop transmit power control operation. An additional step of the method 400 may include determining the initial transmit power level for the communications device based on the strength of the downlink signal, the first coefficient, and a transmitter gain represented by a second coefficient 406.

The method 400 may include additional steps in one embodiment. For example, the method 400 may include storing historical transmission data related to the first coefficient representing receiver gain, as well as historical transmission data related to the second coefficient representing transmitter gain. This historical data may be used by the communications device for use in setting parameters for subsequent transmissions.

Figure 5:
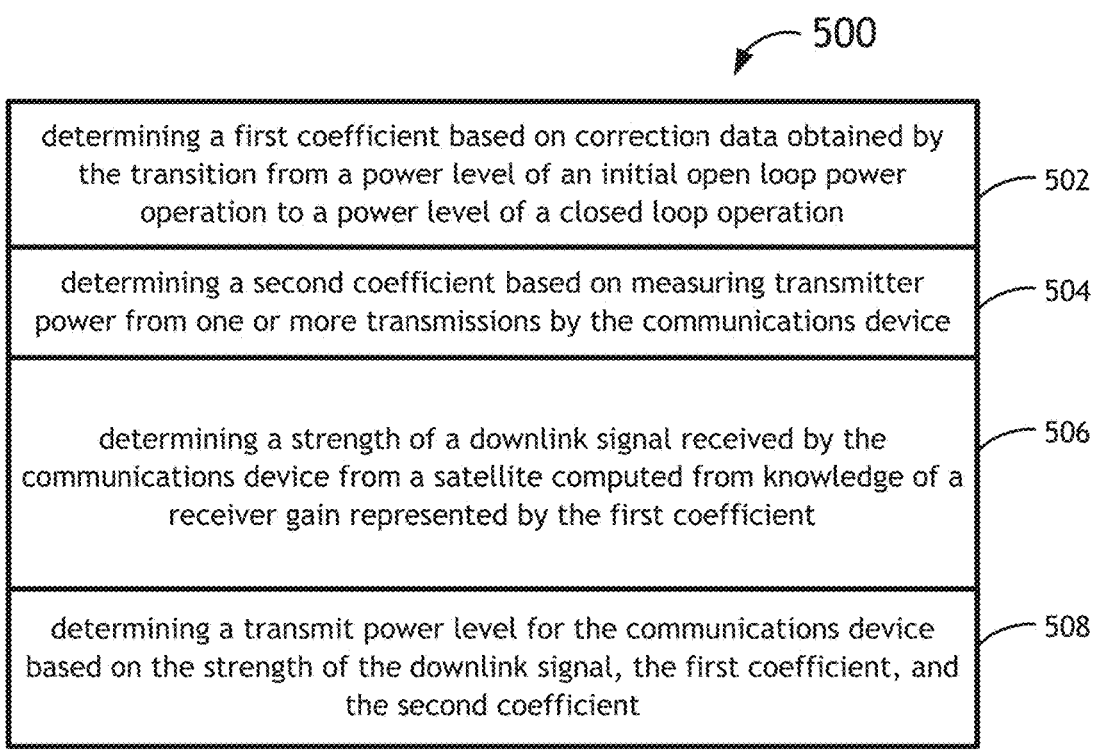
FIG. 5 is a flow diagram depicting a method for calibrating a communications device.

The present disclosure is further directed to a method 500 for calibrating a communications device as shown in FIG. 5. The method 500 may include the step of determining a first coefficient based on correction data obtained by the transition from a power level of an initial open loop power operation to a power level of a closed loop operation 502. The method 500 may also include the step of determining a second coefficient based on one or more transmissions by the communications device 504. A further step of the method 500 may include determining a strength of a downlink signal received by the communications device from a satellite computed from knowledge of a receiver gain represented by the first coefficient 506. The method 500 may also include the step of determining a transmit power level for the communications device based on the strength of the downlink signal, the first coefficient, and the second coefficient 508.

The method 500 may include additional steps in one embodiment. For example, the method 500 may include the step of re-determining the first coefficient. For example, the first coefficient corresponds to receiver gain and may vary depending on the power level of the downlink signal received from the satellite. Therefore, if there is a change in power level of the downlink signal received from the satellite, the receiver gain may change and the first coefficient may be re-determined. Similarly, the method 500 may include the step of re-determining the second coefficient. The second coefficient corresponds to transmitter gain which may also vary depending on the power level. Therefore, changes in the transmitter power level can result in changes in transmitter gain and the second coefficient may be re-determined.

The first coefficient and second coefficient may be determined and re-determined according to the method 500 and the values of the first coefficient and second coefficient may be saved in each instance. In one example, the values of the first coefficient and second coefficient may be saved for several different power levels and used to prepare an array containing values for the first coefficient and second coefficient at the varying power levels. This array may be useful in linearization. For example, when the power level is known, the communications device may look up the corresponding first coefficient and/or second coefficient from the array and use those coefficient values when determining the appropriate transmit power level for the communications device. Similar arrays containing varying values determined for the first coefficient and second coefficient may also be prepared for system variations due to temperature changes or aging effects.

In one embodiment, the method 500 may be performed from time to time. For example, the method 500 may be used to determine and re-determine values for the first coefficient and second coefficient in order to set accurate transmit power levels that account for variations in receiver gain and transmitter gain. The changing values for the first coefficient and second coefficient may be saved in a memory of the communications device and used for setting the transmit power level in future transmissions.

The device and methods of the present disclosure may provide several advantages. For instance, the use of the first coefficient and second coefficient in determining transmit power levels may permit the use of less precisely calibrated modular components, as well as variable cable lengths without the need for elaborate and costly factory or field calibration. In such cases, a simple initialization procedure may provide an adequate calibration to allow the communications device to communicate with a satellite such as a MUOS satellite.

The device and methods of the present disclosure may also provide a means of self-calibration for gain variations. Specifically, by measuring the power on each transmission and comparing it to the expected power output, this allows the communications device to accumulate corrections for each power level. In this manner, linearization may be performed, thus providing a further means of self-calibration.

In addition, the device and methods of the present disclosure may be suitable in regulating power levels between a satellite and a communications device consisting of a single component, or a communications device including multiple modular components having different tolerances and connected by cables having varying cable lengths. This may result in reduced factory test time and cost. Further, the device and methods of the present disclosure may be easily re-calibrated to account for the effects of system deterioration over time or due to changes in system or environmental conditions.

It is understood that while the Mobile User Objective System (MUOS) is referenced in the descriptions above, such a system is merely exemplary. The apparatus and methods for extending signals as described above are applicable to various other types of satellite communications systems without departing from the spirit and scope of the present disclosure. In addition, it is understood that MUOS standard is not required to be the communication standard for a given satellite communications system, and that the ability to provide protocol conversions between the communication standard of a given satellite communications system and various wired or wireless communication protocols may also be utilized without departing from the spirit and scope of the present disclosure.

It is to be understood that the present disclosure may be conveniently implemented in forms of a software/firmware package. Such a software/firmware package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for determining an initial transmit power level from a communications device to a satellite, the method comprising:
   receiving a downlink signal from the satellite via the communications device;
   determining a strength of the downlink signal computed from knowledge of a receiver gain represented by a first coefficient, the first coefficient based on first historical data, the first historical data including correction data obtained by the communications device after a transition from a power level of an initial open loop transmit power control operation to a power level of a closed loop transmit power control operation;
   determining the initial transmit power level for the communications device based on the strength of the downlink signal, the first coefficient, and a transmitter gain represented by a second coefficient, the second coefficient based on second historical data, the determining based on a look-up of the first coefficient and the second coefficient from an array of first coefficients and second coefficients that are listed in the array at one or more corresponding power levels.

2. The method of claim 1, wherein the second historical data is based on measuring transmitter power from one or more transmissions made by the communications device.

3. The method of claim 1, wherein the communications device includes one or more modular components, each component having a tolerance, a sum of the tolerances for each modular component equal to a total tolerance for the communications device.

4. The method of claim 1, wherein the initial transmit power level is in accordance with a specific satellite communications standard.

5. The method of claim 4, wherein the specific satellite communications standard is a Mobile User Objective System (MUOS) standard.

6. The method of claim 1, wherein the satellite is a Mobile User Objective System satellite.

7. The method of claim 1, further comprising:
   storing data for one or more transmissions made by the communications device for use in setting a parameter for a subsequent transmission.

8. A communications device configured for communication with a satellite, the communications device comprising:
   a receiver configured for receiving one or more signals from the satellite, the one or more signals including a downlink signal;
   a transmitter configured for transmitting one or more signals to the satellite;
   a processor in communication with the receiver and the transmitter, the processor configured to:
   a) determine a strength of the downlink signal from knowledge of a receiver gain represented by a first coefficient, the first coefficient based on historical data, the historical data including correction data obtained by the communications device after a transition from a power level of an initial open loop transmit power control operation to a power level of a closed loop transmit power control operation; and b) determine an initial transmit power level for the communications device based on the strength of the downlink signal, the first coefficient, and a transmitter gain represented by a second coefficient, the second coefficient being based on the historical data, wherein at least one of the first coefficient and the second coefficient are retrieved by the processor from a data structure at a corresponding power level.

9. The communications device of claim 8, wherein the historical data further includes stored data from one or more transmissions between the communications device and the satellite, the second coefficient being based on the stored data of the one or more transmissions, and wherein the data structure comprises one of an array and a table.

10. The communications device of claim 8, wherein the initial open loop transmit power control operation is a control operation occurring during a calibration of the communications device, and wherein the closed loop correction data comprises one or more corrections made during the calibration to establish an equalized transmit power level for the communications device, the equalization relative to a plurality of communications devices in communication with the satellite.

11. The communications device of claim 8, wherein the initial open loop transmit power control operation comprises a first initial open loop transmit power control operation and the closed loop correction data comprises first closed loop correction data, the processor further configured to measure data from successful communications including second closed loop correction data obtained after transitioning from a second initial open loop transmit power control operation to the second closed loop transmit power control operation, and wherein data from the first closed loop correction data is used as a set-point for the second initial open loop transmit power control operation.

12. The communications device of claim 8, wherein the communications device includes one or more modular components, each component having a tolerance, a sum of the tolerances for each modular component equal to a total tolerance for the communications device.

13. The communications device of claim 8, wherein the initial transmit power level is in accordance with a specific satellite communications standard, and wherein the specific satellite communications standard is a Mobile User Objective System standard.

14. The communications device of claim 8, wherein a closed loop associated with the closed loop correction data is closed with respect to the satellite and the communications device.

15. A method for calibrating a communications device, the method comprising:
    determining a first coefficient based on closed loop correction data obtained by the communications device after a transition from a power level of an initial open loop power operation to a power level of a closed loop operation;
    determining a second coefficient based on a power level of one or more transmissions by the communications device;
    determining a strength of a downlink signal received by the communications device from a satellite computed from knowledge of a receiver gain represented by the first coefficient;
    saving or storing the first coefficient and the second coefficient in a data structure at a corresponding respective power level; and
    determining a transmit power level for the communications device based on previous successful communications between the satellite and the communications device, the strength of the downlink signal, and a) the first coefficient and the second coefficient, or b) a saved or stored first coefficient and a saved or stored second coefficient.

16. The method of claim 15, further comprising:
    re-determining the first coefficient.

17. The method of claim 15, further comprising:
    re-determining the second coefficient based on at least one additional transmission.

18. The method of claim 15, wherein the satellite is a Mobile User Objective System (MUOS) satellite.

19. The method of claim 15, wherein the communications device is configured to communicate with the satellite utilizing the MUOS standard.

20. The method of claim 15, wherein the processor is further configured to determine the first coefficient based on a comparison of an initial computed open loop power level with a power level of the closed loop operation at equilibrium.

* * * * *